United States Patent
Negro et al.

(10) Patent No.: US 12,361,617 B2
(45) Date of Patent: *Jul. 15, 2025

(54) SYSTEMS AND METHODS FOR STITCHING SEQUENTIAL IMAGES OF AN OBJECT

(71) Applicant: Cognex Corporation, Natick, MA (US)

(72) Inventors: James A. Negro, Arlington, MA (US); Xiangyun Ye, Framingham, MA (US); Ahmed El-Barkouky, Westborough, MA (US)

(73) Assignee: Cognex Corporation, Natick, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/342,956

(22) Filed: Jun. 28, 2023

(65) Prior Publication Data

US 2024/0177382 A1     May 30, 2024

Related U.S. Application Data

(63) Continuation of application No. 17/019,742, filed on Sep. 14, 2020, now Pat. No. 11,727,613, which is a continuation of application No. 15/962,684, filed on Apr. 25, 2018, now Pat. No. 10,776,972.

(51) Int. Cl.
*G06T 11/60* (2006.01)
*G06K 19/06* (2006.01)
(Continued)

(52) U.S. Cl.
CPC ........ *G06T 11/60* (2013.01); *G06K 19/06037* (2013.01); *G06T 3/18* (2024.01);
(Continued)

(58) Field of Classification Search
CPC . G06T 11/60; G06T 3/18; G06T 7/251; G06T 2207/20081; G06K 19/06037; G06V 20/46; H04N 23/698; H04N 23/74
See application file for complete search history.

(56) References Cited

U.S. PATENT DOCUMENTS 10,776,972 B2 *   9/2020   Negro ............... H04N 23/74
2007/0237356 A1   10/2007  Dwinell
(Continued)

FOREIGN PATENT DOCUMENTS

JP   2002232755     8/2002
JP   2007208704     8/2007
JP   2015-181302 A  10/2015

OTHER PUBLICATIONS

The Official Action issued by the Chinese Patent Office on Jan. 21, 2024 for corresponding Chinese Patent Application No. 2019103342287; 15 pages.

(Continued)

*Primary Examiner* — Sinh Tran
*Assistant Examiner* — Angel L Garces-Rivera
(74) *Attorney, Agent, or Firm* — Quarles & Brad LLP

(57) ABSTRACT

A system may comprise a transport device for moving at least one object, wherein at least one substantially planar surface of the object is moved in a known plane locally around a viewing area, wherein the substantially planar surface of the object is occluded except when the at least one substantially planar surface passes by the viewing area, at least one 2D digital optical sensor configured to capture at least two sequential 2D digital images of the at least one substantially planar surface of the at least one object that is moved in the known plane around the viewing area, and a controller operatively coupled to the 2D digital optical sensor, the controller performing the steps of: a) receiving a first digital image, b) receiving a second digital image, and c) stitching the first digital image and the second digital image using a stitching algorithm to generate a stitched image.

18 Claims, 13 Drawing Sheets

(51) Int. Cl.
 G06T 3/18        (2024.01)
 G06T 7/246       (2017.01)
 G06V 20/40       (2022.01)
 H04N 23/698      (2023.01)
 H04N 23/74       (2023.01)

(52) U.S. Cl.
 CPC .............. *G06T 7/251* (2017.01); *G06V 20/46* (2022.01); *H04N 23/698* (2023.01); *H04N 23/74* (2023.01); *G06T 2207/20081* (2013.01)

(56) References Cited

U.S. PATENT DOCUMENTS

2013/0020392 A1   1/2013   Olmstead
2013/0292470 A1   11/2013  Shearin et al.
2018/0005392 A1   1/2018   Gao

OTHER PUBLICATIONS

The Extended European Search Report and Search Opinion issued by the European Patent Office on Aug. 20, 2019 for corresponding European Patent Application No. 19167804; 7 pages.

The Official Action issued by the Japanese Patent Office on Oct. 18, 2022 for corresponding Japanese Patent Application No. 2019-082792; 8 pages.

The Official Action issued by the Japanese Patent Office on Aug. 2, 2023 for corresponding Japanese Patent Application No. 2019-082792; 2 pages.

The Extended European Search Report and Search Opinion issued by the European Patent Office on Apr. 7, 2021 for corresponding European Patent Application No. 21153793; 9 pages.

The Official Action issued by the Japanese Patent Office on Apr. 24, 2024 for corresponding Japanese Patent Application No. 2019-082792; 12 pages.

The Communication pursuant to Article 94(3) released by the European Patent Office on Jan. 29, 2024 for corresponding European Patent Application No. 21153793.1; 7 pages.

Adamo, et al., "Calibration of an Inspection System for Online Quality Control of Satin Glass", IEEE Transactions on Instrumentation and Measurement; vol. 50, No. 5, pp. 1035-1046; May 1, 2010.

Office Action for JP 2019-82792, dated Nov. 5, 2024, 11 pages.

* cited by examiner

SYSTEMS AND METHODS FOR STITCHING SEQUENTIAL IMAGES OF AN OBJECT

CROSS-REFERENCE TO RELATED PATENT APPLICATIONS

This patent application is a continuation of U.S. patent application Ser. No. 17/019,742, filed Sep. 14, 2020, which claims priority to U.S. patent application Ser. No. 15/962,684, filed Apr. 25, 2018, now U.S. Pat. No. 10,776,972 issued Sep. 15, 2020, the contents of both of which are incorporated in their entirety herein.

FIELD OF TECHNOLOGY

The present invention relates to the technical field of image stitching. In particular, the present invention relates to high-speed stitching of 2D images generated in a windowed conveyor system.

BACKGROUND OF THE INVENTION

Vision systems that perform measurement, inspection, alignment of objects, and/or decoding of symbology, such as one-dimensional and two-dimensional barcodes, are used in a wide range of applications and industries. These systems are based around the use of an image sensor, which acquires images of an object, and processes these acquired images using an on-board or interconnected vision system processor. The image is typically captured as an array of image pixels each having various colors and/or intensities.

A common use for such imaging systems is to track and sort objects moving along a conveyor in manufacturing and logistics operations. Typically, such imaging systems capture all sides of an object being tracked, which results in capture of six sides of a cuboidal object in many cases. In such systems, it is necessary to capture the bottom of the object, which is the side of the object that is in contact with the conveyor.

In some instances, a line-scan camera can be employed to address object movement and a wide field of view. However, such solutions are not applicable for certain object geometries and line arrangements. In addition, while line scan image sensors tend to be less costly than conventional format area scan sensors, the overall system costs of using line scan image sensors may be significantly higher, due to increased computation and processing requirements. For example, line scan image sensors require a complete image to be reconstructed in software line by line. Further, alignment of object motion and image acquisition timing is critical.

Area scan image sensors image a defined area quickly and allow easier setup and alignment and greater flexibility than line scan sensors. However, even with area scan image sensors, due to factors such as the size of the object, the resolution of the imager, the geometry of the conveyor, etc., only partial views of the object may be captured. Accordingly, some processing to reconstruct a complete image may be needed.

Another consideration is which sides of the object are to be imaged, as the system configuration may differ depending on whether the bottom side, top side, or other sides of an object are to be imaged. For example, in some applications, several or all sides of an object are to be imaged, including the bottom side. In other applications, imaging of only one side is required. For example, the bottom side may be imaged instead of the top side so as to avoid complications relating to imaging objects with different heights, which may have different distances from the camera.

In some applications, one camera or more cameras may be used to image each side of an object, while in other applications, two or more cameras may be used to image one side of an object. In applications in which one side of an object is to be imaged, a single standard-resolution camera may not provide adequate resolution, and an adequate coverage area and two or more cameras may be used to image that side of the object.

SUMMARY OF INVENTION

Embodiments of the present invention may provide high resolution images of the surface of objects of varying shapes and sizes as they move through a conveyor system. Such embodiments may relate to a solution to the problem of scanning the bottom side of boxes or other objects moving on a high-speed conveyor belt using one or more 2D cameras. Current systems rely on line-scan cameras to image objects, such as boxes.

The scanning of bottom side in a logistics tunnel application is particularly challenging because the physical constraints of the system limit the visibility of the box's bottom side to only a small slice at a time. To generate images for the bottom side, small image slices can be acquired (through a gap between two sections of the conveyor belt) and then stitched.

In an embodiment, a system may comprise a transport device for moving at least one object, wherein at least one substantially planar surface of the object is moved in a known plane locally around a viewing area, wherein the substantially planar surface of the object is occluded except when the at least one substantially planar surface passes by the viewing area, at least one 2D digital optical sensor configured to capture at least two sequential 2D digital images of the at least one substantially planar surface of the at least one object that is moved in the known plane around the viewing area, and a controller operatively coupled to the 2D digital optical sensor, the controller performing the steps of: a) receiving a first digital image, b) receiving a second digital image, and c) stitching the first digital image and the second digital image using a stitching algorithm to generate a stitched image.

In embodiments, the controller may repeatedly perform steps a)-c). The first digital image may comprise at least one of a captured digital image or a resulting image of previously stitched images. The surface that is moved through the known plane may be one of: a bottom surface of the object or a side surface of the object, the transport device may comprise a viewing area located on a corresponding surface of the transport device, and the 2D digital images may be captured through the viewing area. The transport device may comprise a conveyor and the viewing area may comprise one of an optical window in the conveyor, a gap in the conveyor surface, or a gap between two conveyor devices.

In embodiments, the system may further comprise a light source configured to illuminate the one or more objects in the viewing area, wherein the controller may be coupled to the light source to control illumination from the light source, and wherein the controller strobes the light source. A sensor may be configured to detect a presence and an absence of an object on the transport device and may control acquisition of images based on the presence or the absence of an object on the transport device. The system may further comprise a mirror, and the 2D digital optical sensor may capture the digital images through the mirror. The controller may decode a mark based on the stitched image.

In embodiments, the stitching algorithm may comprise determining a 2D coordinate transform to be used to align the first digital image and the second digital image, warping the second digital image using the found 2D coordinate transform, and blending the warped second digital image with the first digital image. The transport device may operate in accordance with a substantially linear motion, wherein the controller may comprise a model of the substantially linear motion of the transport device, and wherein the stitching algorithm may use the model of the substantially linear motion of the transport device. The system may further comprise a motion encoder, controlling acquisition of images based on the motion encoder, and wherein determining an image transform may be further based on an estimate of object translation generated by the motion encoder. The system may further comprise a light source configured to illuminate the one or more objects in the viewing area, wherein the controller may be coupled to the light source to control illumination from the light source based on the estimate of object translation generated by the motion encoder, and wherein the controller may strobe the light source based on the estimate of object translation generated by the motion encoder.

In embodiments, the 2D optical sensor may be configured to capture a reduced field of view determined by one of manually or by analyzing a full image acquired at setup time. An approximate 2D coordinate transform may be estimated through a training process using a plurality of digital images slices captured for a calibration moving object that has a known pattern of features. The system may further comprise a plurality of 2D digital optical sensors, each 2D digital optical sensor configured to capture a plurality of sequential digital images, associated with the one or more objects, through the viewing area, and the plurality of 2D digital optical sensors configured to capture digital images substantially simultaneously.

In embodiments, at least one of each digital image from a camera may be stitched together with an image slice captured substantially simultaneously by each other camera to form combined image slices, then the combined image slices may be stitched together to form a complete image, each digital image from each camera may be stitched together with a digital image of the sequentially captured digital images from that camera, then the stitched images from each camera of the plurality of cameras may be stitched together to form a complete image, or each digital image from each camera may be stitched directly to the same resulting image of previously stitched images from all cameras.

In embodiments, a computer-implemented method may comprise moving, by a transport device, at least one object, wherein at least one substantially planar surface of the object is moved in a known plane locally around a viewing area, wherein the substantially planar surface of the object is occluded except when the at least one substantially planar surface of the object passes by the viewing area, capturing, by at least one 2D digital optical sensor, at least two sequential 2D digital images of the surface of the object that is translated in the known plane locally around the viewing area, and stitching a first digital image and a second digital image using a stitching algorithm to generate a stitched image.

In embodiments, the stitching may be performed repeatedly and may comprise determining a 2D coordinate transform to be used to align the first digital image and the second digital image, warping the second digital image using the found 2D coordinate transform, and blending the warped second digital image with the first digital image. The controller may decode a mark based on the stitched image. There may be a plurality of 2D digital optical sensors capturing images, and at least one of each digital image from a 2D digital optical sensor may be stitched together with an image slice captured substantially simultaneously by each other 2D digital optical sensor to form combined image slices, then the combined image slices may be stitched together to form a complete image, each digital image from each 2D digital optical sensor may be stitched together with a digital image of the sequentially captured digital images from that 2D digital optical sensor, then the stitched images from each 2D digital optical sensor of the plurality of 2D digital optical sensor may be stitched together to form a complete image, or each digital image from each 2D digital optical sensor may be stitched directly to the same resulting image of previously stitched images from all 2D digital optical sensors.

In embodiments, the stitching may be performed using parallel processing or the controller decodes a mark based on the stitched image and the stitching and the decoding are performed using parallel processing.

In embodiments, the stitching may be performed repeatedly and the stitching may comprise determining a 2D coordinate transform to be used to align the first digital image and the second digital image, warping the second digital image using the found 2D coordinate transform, and blending the warped second digital image with the first digital image. The controller may decode a mark based on the stitched image. There may be a plurality of 2D digital optical sensors capturing images and there may be at least one of each digital image from a 2D digital optical sensor is stitched together with an image slice captured substantially simultaneously by each other 2D digital optical sensor to form combined image slices, then the combined image slices are stitched together to form a complete image, each digital image from each 2D digital optical sensor is stitched together with a digital image of the sequentially captured digital images from that 2D digital optical sensor, then the stitched images from each 2D digital optical sensor of the plurality of 2D digital optical sensor are stitched together to form a complete image, or each digital image from each 2D digital optical sensor is stitched directly to the same resulting image of previously stitched images from all 2D digital optical sensors. The stitching may be performed using parallel processing or the controller may decode a mark based on the stitched image and the stitching and the decoding may be performed using parallel processing.

The method may further comprise controlling illumination from a light source configured to illuminate the object in the viewing area based on the estimate of object translation generated by the motion encoder. The method may further comprise strobing the light source based on the estimate of object translation generated by the motion encoder. The method may further comprise controlling illumination from a light source configured to illuminate the object in the viewing area. The method may further comprise strobing the light source. The method may further comprise detecting a presence and an absence of an object on the conveyor device using a sensor. The method may further comprise controlling acquisition of images based on the presence or the absence of an object on the conveyor device. The method may further comprise controlling illumination from the light source based on the presence or the absence of an object on the conveyor device. The method may further comprise forming the single stitched image based on a fixed distance at which the 2D digital camera is located from the viewing area. The method may further comprise capturing the digital images with the 2D digital camera through a mirror.

The conveyor may operate in accordance with a substantially linear motion. The method may further comprise modeling the substantially linear motion of the conveyor. The method may further comprise using the model of the substantially linear motion of the conveyor to perform the stitching. The method may further comprise capturing a plurality of digital images substantially simultaneously using a plurality of 2D digital cameras, each 2D camera configured to capture a plurality of sequential digital images, associated with the one or more objects, through the viewing area. The method may further comprise stitching together each digital image from a camera with an image captured substantially simultaneously by each other camera to form combined images, then stitched together the combined image slices are to form a complete image. The method may further comprise stitching together each digital image from each camera with a digital image of the sequentially captured digital images from that camera, then stitching together stitched images from each camera of the plurality of cameras together to form a complete image.

Numerous other embodiments are described throughout herein. All of these embodiments are intended to be within the scope of the invention herein disclosed. Although various embodiments are described herein, it is to be understood that not necessarily all objects, advantages, features or concepts need to be achieved in accordance with any particular embodiment. Thus, for example, those skilled in the art will recognize that the invention may be embodied or carried out in a manner that achieves or optimizes one advantage or group of advantages as taught or suggested herein without necessarily achieving other objects or advantages as may be taught or suggested herein.

The methods and systems disclosed herein may be implemented in any means for achieving various aspects, and may be executed in a form of a machine-readable medium embodying a set of instructions that, when executed by a machine, cause the machine to perform any of the operations disclosed herein. These and other features, aspects, and advantages of the present invention will become readily apparent to those skilled in the art and understood with reference to the following description, appended claims, and accompanying figures, the invention not being limited to any particular disclosed embodiment(s).

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and the invention may admit to other equally effective embodiments.

Other features of the present embodiments will be apparent from the Detailed Description that follows.

DETAILED DESCRIPTION OF THE EMBODIMENTS

In the following detailed description of the preferred embodiments, reference is made to the accompanying drawings, which form a part hereof, and within which are shown by way of illustration specific embodiments by which the invention may be practiced. It is to be understood that other embodiments may be utilized and structural changes may be made without departing from the scope of the invention. Electrical, mechanical, logical, and structural changes may be made to the embodiments without departing from the spirit and scope of the present teachings. The following detailed description is therefore not to be taken in a limiting sense, and the scope of the present disclosure is defined by the appended claims and their equivalents.

Figure 1:
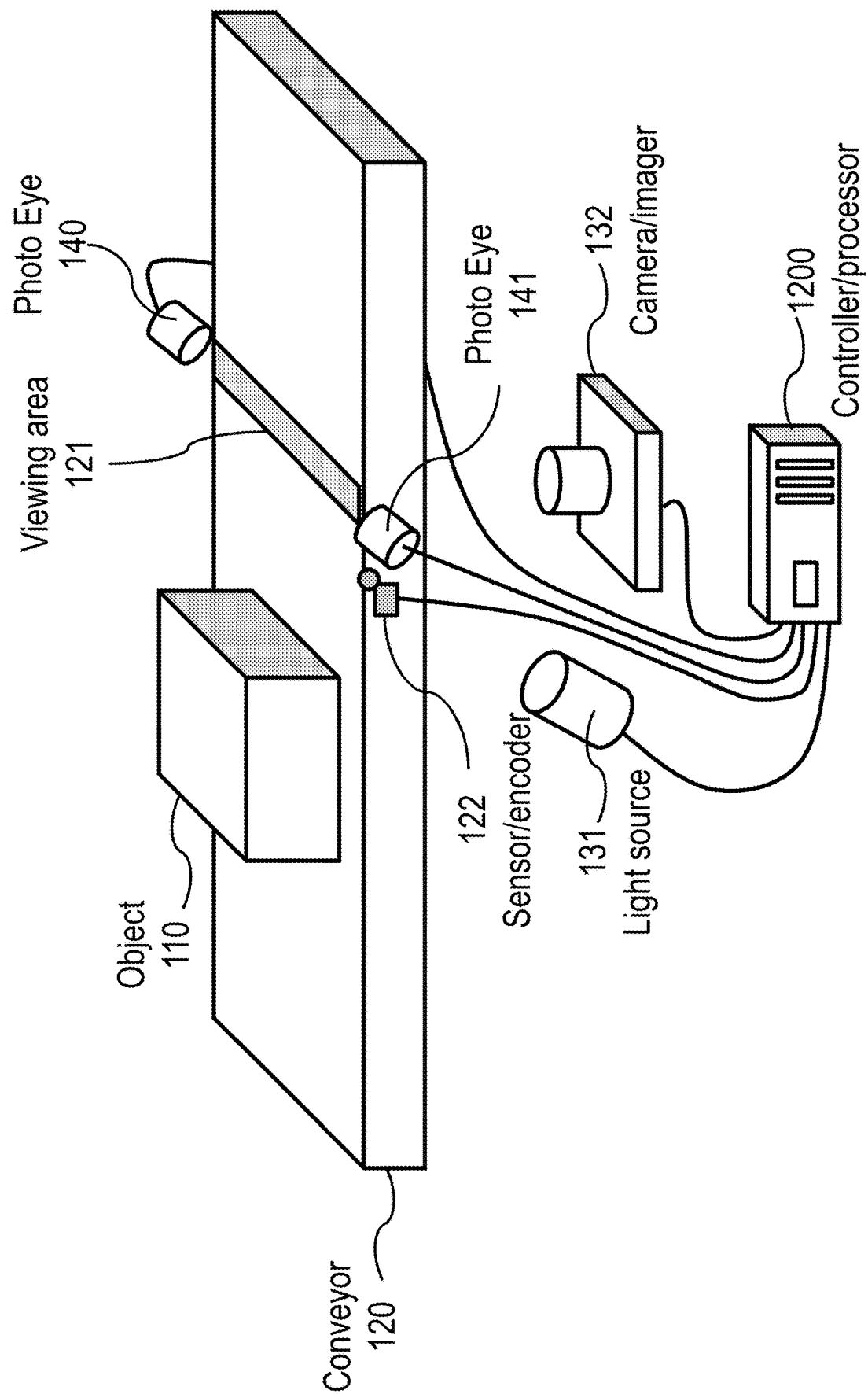
FIG. 1 illustrates an example of a top view schematic diagram of the system, according to an embodiment.

FIG. 1 illustrates a top view schematic diagram of the system, according to an embodiment. The system may include transport device, such as a conveyor 120 or a robotic arm (not shown), at least one camera 132, and a controller/processor 1200. The conveyor 120 may translate an object 110, such as a parcel, across a belt, rollers, or other conveyor mechanism through the field of view of camera/imager 132. Likewise, robotic arm (not shown) may grasp or otherwise hold an object 110, such as a parcel, for example, with a robotic hand or claw, or with a suction device or the like. The robotic arm may move the object through the field of view of camera/imager 132. The transport device, of whatever type, may translate the object 110 in a known plane locally around a viewing area, such as viewing area 121. However, in embodiments, the translation of object 110 when not in the viewing area may not be in the known plane. Rather, outside the viewing area, the transport device may translate object 110 in any direction or form of motion. Although, in the particular examples described herein, a conveyor or a robotic arm may be referred to, it is to be understood that, in embodiments, the transport device may include a conveyor, a robotic arm, or any other device that is capable of transporting an object.

The conveyor 120 may have a viewing area 121 on its surface. For example, the viewing area 121 may include a window, such as a glass window or scratch resistant plastic window, or viewing area 121 may include an opening. Although viewing area 121 may be of any size, typically the width (perpendicular to the direction of travel of the conveyor) of viewing area 121 is as large as possible in order to enable capturing of the entire bottom of each object 110. For example, in embodiments, the width of viewing area 121 may be approximately equal to the width of conveyor 120, or only slightly smaller in order to accommodate the structure of conveyor 120. In embodiments where viewing area 121 includes a window, the length (in the direction of travel of the conveyor) of the window may be relatively large, although not so large as to interfere with the travel of objects on the conveyor. For example, a typical window may be approximately one quarter inch to two inches in length. In embodiments where viewing area 121 includes a gap, the gap cannot be so large as to interfere with the travel of objects on the conveyor. For example, a relatively large gap may be so large that objects fall through the gap and off of conveyor 120. Likewise, a gap may be so large that objects on the conveyor may have a non-uniform movement due to the leading edge slightly falling down and then coming back up. In some embodiments, the gap may be provided by an opening in a section of conveyor 120, while in other embodiments, the gap may be provided by a separation between two sections of conveyor 120. These are merely examples of viewing areas. In embodiments, viewing areas may have some physical implementation, such as a window or gap, while in other embodiments, the viewing area may be merely some region in space within which camera/imager 132 may capture images of a surface of object 110 that are of adequate quality and resolution so as to be processed as described below.

In the example shown in FIG. 1, an object may be translated on conveyor 120 so as to image a bottom surface of the object. In this example, the bottom surface of the object is in the plane of conveyor 120. Thus, the plane of conveyor 120 may be considered to form a known plane. In embodiments, a bottom surface of an object may be imaged in conjunction with gravity to ensure that the bottom surface of the object is in the known plane, conveyor 120. The known plane may then form the plane upon which the surface of the object may be imaged, either directly, or through a window or gap in any apparatus in the known plane.

In other embodiments, any surface of an object may be imaged in conjunction with an apparatus to ensure that surface of the object is in or parallel to a known plane. This known plane may then form the plane upon which the surface of the object may be imaged, either directly, or through a window or gap in any apparatus in the known plane. Accordingly, embodiments may image a bottom surface, a top surface, or any side surface of an object. Further, it is to be noted that such surfaces may themselves not be entirely planar or flat. For example, in some cases, a surface of a box may be planar, but in some cases the surface of the box may be dented, bent, or folded. In some cases, the object may not be a box, but may be an envelope, pouch, or other irregularly shaped object. The significant point is that the surface of the object to be captured is substantially planar, that is, sufficiently planar for the camera to capture images of the surface of the object with sufficient clarity for the images to be processed as described herein.

The camera 132 may capture images through the viewing area 121. The camera 132 may capture images directly, or it may capture images through a series of mirrors (not shown). Although in this example, one camera is shown, in embodiments, more than one camera may be used. For example, where the width (perpendicular to the direction of travel of conveyor 120) is too large to be captured by one camera, or is too large to be captured with adequate image quality by one camera, two or more cameras may be used. Embodiments may be applicable to any number of cameras. An example of such an embodiment is described in more detail below.

The camera 132 may capture images sequentially as the object is translated through the camera's field of view. Sequential images may be captured in some particular order. It is not required that sequential images are captured one after another with no intermediate images captured. For example, in embodiments, fewer than every possible image may be captured, but such images are still sequential. In embodiments, some images in the sequence may be skipped, but the resulting images are still sequential. For example, in embodiments, every n-th image may be captured (or skipped) to form a sequence, or every image may be captured or skipped at irregular intervals. Likewise, in embodiments, each captured image may be processed or each n-th captured images may be processed (or skipped). The term sequential encompasses any and all such sequences.

A light source 131 may accompany the camera to provide adequate lighting and illuminate dark surfaced objects. For example, in embodiments, light source 131 may include a strobe, such as a strobe light or stroboscopic lamp, which may produce flashes of light as controlled by controller/processor 1200. Such a strobe light may include an intermittent light source, such as a xenon flash lamp, or flashtube, or it may include a more continuous light source operated in an intermittent manner, such as a Light Emitting Diode (LED) lamp, an incandescent lamp, a halogen lamp, etc. The purpose of strobe light is to provide sufficient amount of light in very short exposure time so that the acquired image does not have motion blur when the object is moving. Compared to a strobe light, a line scan camera may require lights that are constantly on and that may be less energy efficient. The intensity and duration of each flash may be controlled by controller/processor 1200, or other exposure control circuitry, based on factors that may include the reflectivity of the object being captured, reflections from any window that may be present in viewing area 121, the speed of the conveyor, etc., In other embodiments, light source 131 may include fixed or constant lighting. Likewise, the intensity of such lighting may be controlled by controller/processor 1200, or other exposure control circuitry, based on factors that may include the reflectivity of the object being captured, reflections from any window that may be present in viewing area 121, the speed of the conveyor, etc. The light source 131 may be at a different angle from the camera relative to the window to prevent oversaturation of part of the image because of prevent reflections, which may occur, for example, if a window present in viewing area 121 is made of glass or another transparent material. In other embodiments, polarized light may be used to prevent reflections issues.

In some embodiments, the system may include a speed or translation sensor or encoder 122 attached to the conveyor 120. Sensor/encoder 122 may be connected to the controller/processor 1200 to provide information on the speed of the conveyor 120 and/or the translation of the object 110 on the conveyor 120. Such speed and/or translation may be measured periodically or otherwise repeatedly so as to detect changes in the speed and/or translation. In embodiments, sensor/encoder 122 may be a rotary encoder, a shaft encoder, or any other electromechanical device that may convert the angular position or motion of a wheel, shaft, or axle on the conveyor 120, or attached to conveyor 120, to an analog signal or a digital code that may be received by the controller. The controller/processor may convert such an analog signal to a digital representation using an analog-to-digital converter. In embodiments, encoder 122 may provide an absolute or relative speed or translation output.

In embodiments, encoder 122 may determine translation of an object on conveyor 120 and may output one or more pulses per unit distance of travel of the object 110 or conveyor 120. For example, encoder 122 may be arranged to provide one revolution of rotary motion per 12 inches of travel of conveyor 120. Encoder 122 may be arranged to provide a number of pulses per revolution, such as 24 pulses per revolution. In this example, one pulse from encoder 122 may occur for every one-half inch of motion of conveyor 120. In embodiments, the rotary motion per travel of conveyor 120 and the number of pulses per revolution may be fixed, or these parameters may be adjustable or programmable.

Controller/processor 1200 may be arranged so as to cause camera 132 to capture an image upon each pulse, or a number of pulses, from encoder 122. Each such image captured may be used to form an image slice to be stitched as described below. As the image resolution is known or may be determined, then the image resolution of each unit of motion for each pulse may be determined. For example, if it is arranged or determined that camera 132 captures a one inch long (in direction of motion of the conveyor) image, and that camera 132 has a resolution of 200 dots per inch in that direction, and since each pulse of encoder 122 occurs every half inch, then it may be determined that a new image slice is captured every 100 pixels or half inch. In addition, it may be seen that, if each image slice is 200 pixels or one inch long, and a new image slice is captured every 100 pixels or half inch, then each new image slice overlaps the previous image slice by 100 pixels or one-half inch. It is to be noted that in many instances the terms "dots" and "pixels" may be used equivalently. It is further to be noted that these numbers are merely examples. In embodiments, any values of, and combinations of, rotary motion per travel of conveyor 120, the number of pulses per revolution, total camera 132 resolution, and camera 132 resolution per unit distance may be utilized.

The controller/processor 1200, shown in an embodiment in FIG. 1, may connect to and communicate with the camera 132. Controller/processor 1200 may receive image data from camera 132 and perform image stitching for forming combined images. The received images may be stored in a buffer for later processing, or may be immediately processed. In embodiments, the controller/processor 1200 may receive a stream of images and may use captured images to determine whether an object is present. For example, controller/processor 1200 may perform background detection on captured images to determine that an object is present in viewing area 121. When the presence of an object in the viewing area 121 is detected, controller/processor 1200 may perform image stitching and/or additional image capture. In other embodiments, the controller/processor 1200 may receive a trigger from a sensor 140, 141, such as an electro-optical sensor, such as a photo eye to begin capturing images and to strobe the light source. The sensor may include a photo eye including an infrared light or visible light emitter 140 and a photoelectric cell, photo-diode, or photo-transistor to detect when the light from emitter 140 is blocked, indicating the presence of an object, or not block, indicating that no object is present. The controller/processor 1200 may also be connected to the optional encoder 122 to receive object translation data.

Figure 2:
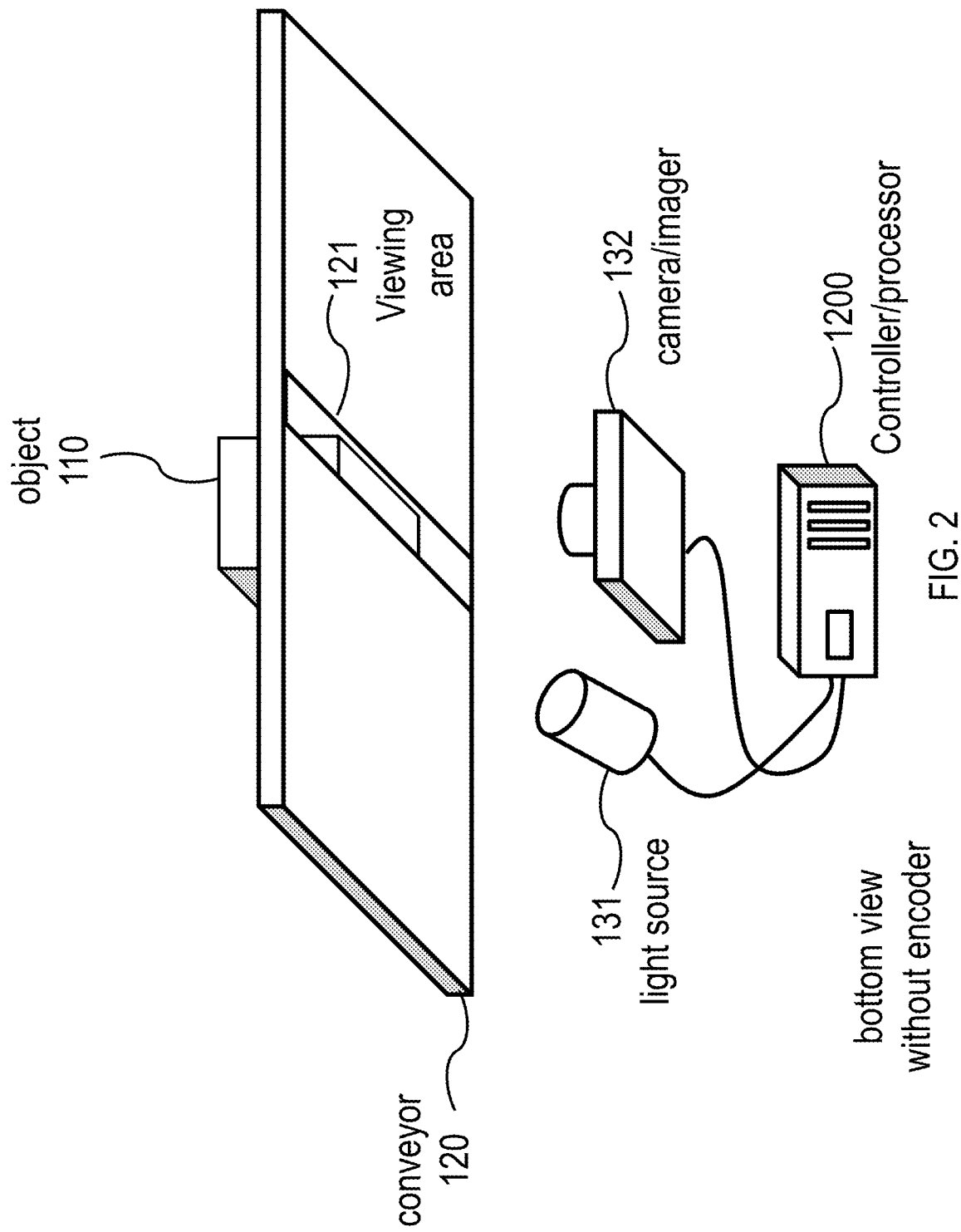
FIG. 2 illustrates an example of a bottom view schematic diagram of the system, according to an embodiment.

FIG. 2 illustrates a bottom view schematic diagram of the system, according to an embodiment. In this example, the parcel 110 is partially visible in viewing area 121. A single image capture by the camera 132 may be unable to acquire the entire bottom surface of the parcel 110. By stitching the several images together, a composite image of the entire bottom surface of the parcel 110 may be made.

Figure 3:
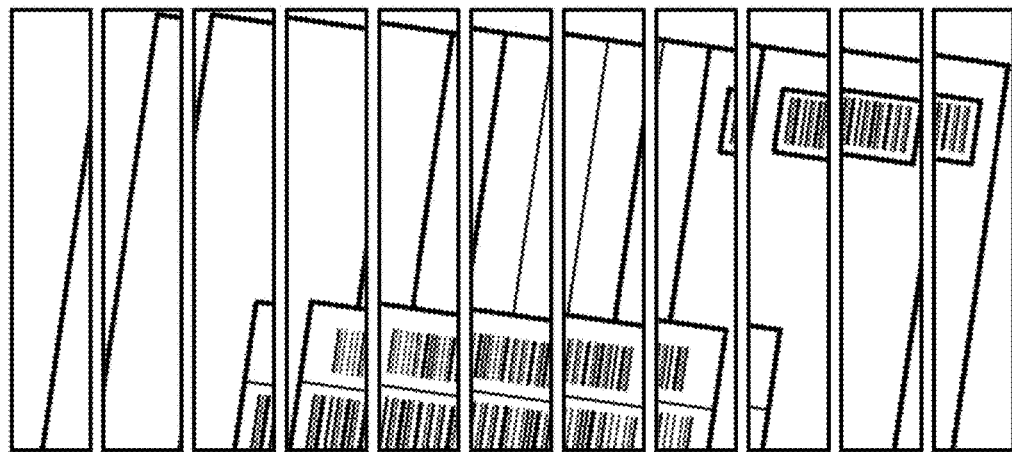
FIG. 3 is an exemplary illustration of an example of a sequence of images acquired by a two-camera sequential stitching system, according to an embodiment.
Figure 3:
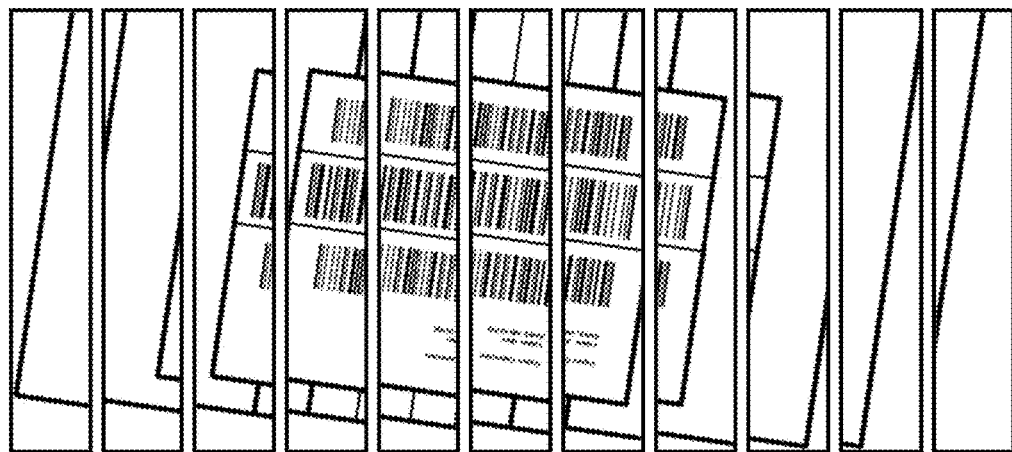

FIG. 3 illustrates an exemplary sequence of images 300 acquired by a two-camera sequential stitching system, according to an embodiment. Each strip represents a single image captured by a camera. The left column shows images captures from a first camera, and the right column shows images captured by a second camera. The viewing area 121 in this case is a wide rectangle. The images captured may overlap from image to image for each camera. In addition, there may be overlap in the coverage between the two cameras. In embodiments, at least an image and the immediately following image may be stitched to form an output image. In embodiments, each image in a series of images may be sequentially stitched to the previously stitched images to form a complete image.

Figure 4:
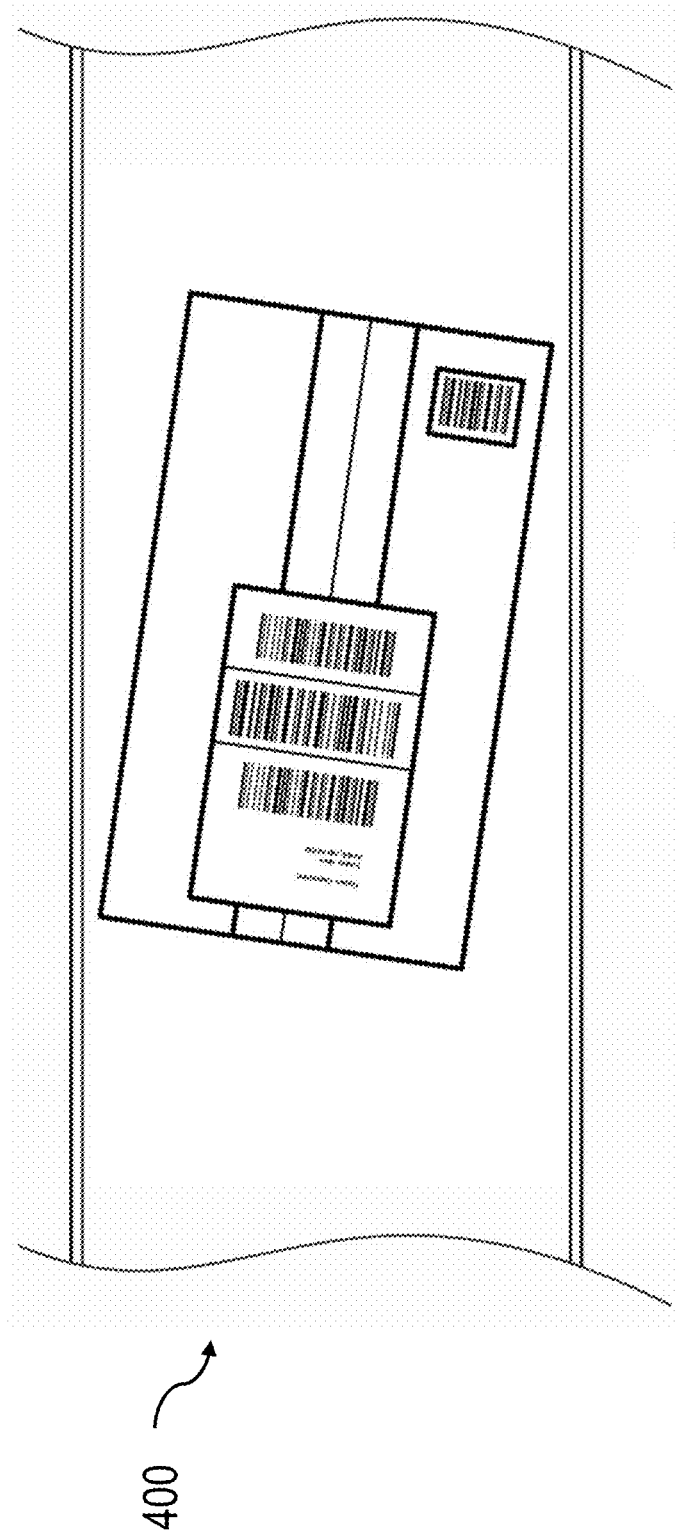
FIG. 4 is an exemplary illustration of an example of a stitched image generated by the system, according to an embodiment.

FIG. 4 illustrates an example of a stitched image generated by the system, according to an embodiment. In this image, the entire surface of the parcel can be seen. The image appears as a single capture would appear, although multiple images were stitched to produce the image.

Figure 5:
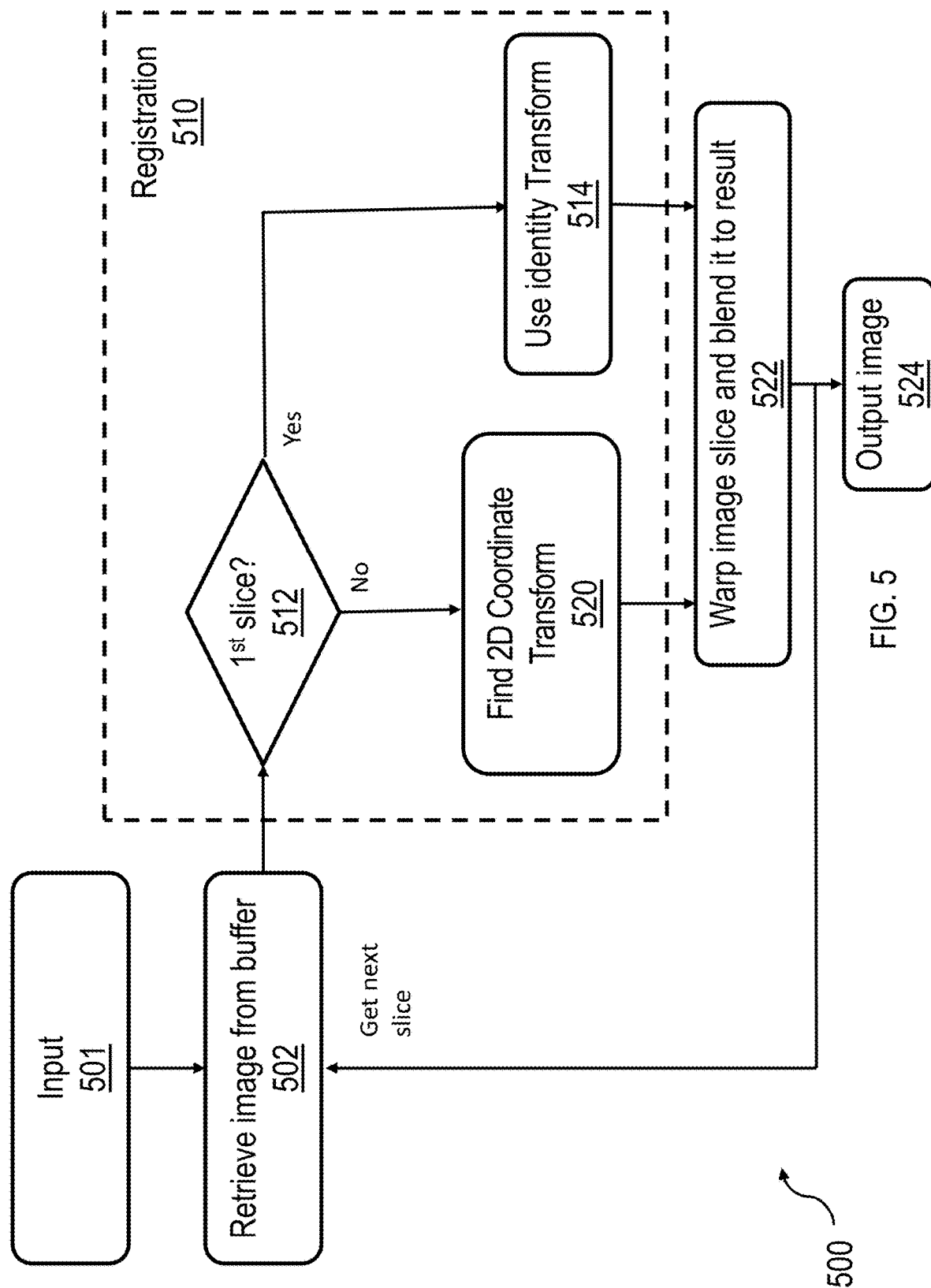
FIG. 5 illustrates an example of a flow diagram of an image stitching process, according to an embodiment.

FIG. 5 illustrates a flow diagram of an embodiment of an image stitching operation. The operations in the flow diagram may be performed, for example, by the controller/processor 1200. In an embodiment, process 500 may sequentially stitch image slices to form a complete result image of the object of interest. The process begins with input process 501, in which image slices may be acquired sequentially from each camera, as described above, and may be stored in a memory buffer, typically located in controller/processor 1200. In 502, the system retrieves an image slice from the buffer. The system may then perform a registration process 510 to find a 2D coordinate transform that aligns the current image slice to the result image. Then, process 522 may be used to warp the current image slice and blend it to the result image using that 2D coordinate transform. Process 502 to process 522 may then be repeated for all the acquired image slices of interest to produce the final result image 524.

Regarding the 2D coordinate transform, a digital image is a two-dimensional array with each pixel having a position (coordinates) and intensity value (color or gray scale level). A 2D coordinate transform relates positions from one image to the other. An image warping and blending process applies that 2D coordinate transform to determine an intensity value at each pixel in the result image.

In process 512, it may be determined whether or not the image slice retrieved from the buffer is the first slice in a series of acquired slices for one object. If so, process 500 continues with 514, in which an identity 2D coordinate transform may be applied to the image slice. For example, the identity transform may lead to copying the image slice as is to the result image in step 522. In other words, for each object, the first image slice may be acquired and copied as is to the result image that might be an empty result image. When the next image slice is acquired, image warping may be applied to warp the next image slice to the result image so as to allow stitching to be performed correctly.

If, at process 512, it is determined that the image slice retrieved from the buffer is not the first slice in a series of acquired slices, process 500 continues with process 520, in which a 2D coordinate transform may be determined that is to be used to align the two digital images that are currently being processed. Then, at process 522, the newly retrieved digital image may be warped using the found 2D coordinate transform and the warped digital image may be blended with the other digital image being processed.

For example, in embodiments, the 2D coordinate transform may be found by extracting features in the form of key points from the current image slice. Then, the key points may be used to search for matching key points in the second image, which may be represented in this process by the result image containing all the previously stitched image slices. At process 520, the corresponding set of matched key points may be used to fit a 2D coordinate transform that aligns the current image slice to the result image. For example, in some embodiments, a 2D coordinate transform may be determined by extracting a first set of features from a first digital image, extracting a second set of features from a second digital image, matching at least one extracted feature from the first set of features and the second set of features, and determining an image transform based on the matched feature.

The process of feature extraction, for example, may use the Histogram of Oriented Gradients (HOG) features to find key points with rich texture. The HOG feature map is an array with n-dimensional feature vectors as its entries. Each feature vector describes a local image patch called a tile. The image Region of Interest (ROI), which may be the region of overlap between two slices, is first divided into non-overlapping tiles of fixed size, for example 8 pixels by 8 pixels. Then for each tile, a one-dimensional histogram of gradient orientations is calculated over its pixels. The gradient magnitude and orientation are calculated at each pixel using for example finite difference filters. For color images, the color channel with the largest gradient magnitude is typically used. The gradient orientation at each pixel is then quantized into one of "n" orientation bins with a voting strength that depends on its gradient magnitude to collectively build up the histogram of oriented gradients in this tile as a vector of length "n".

Figure 6:
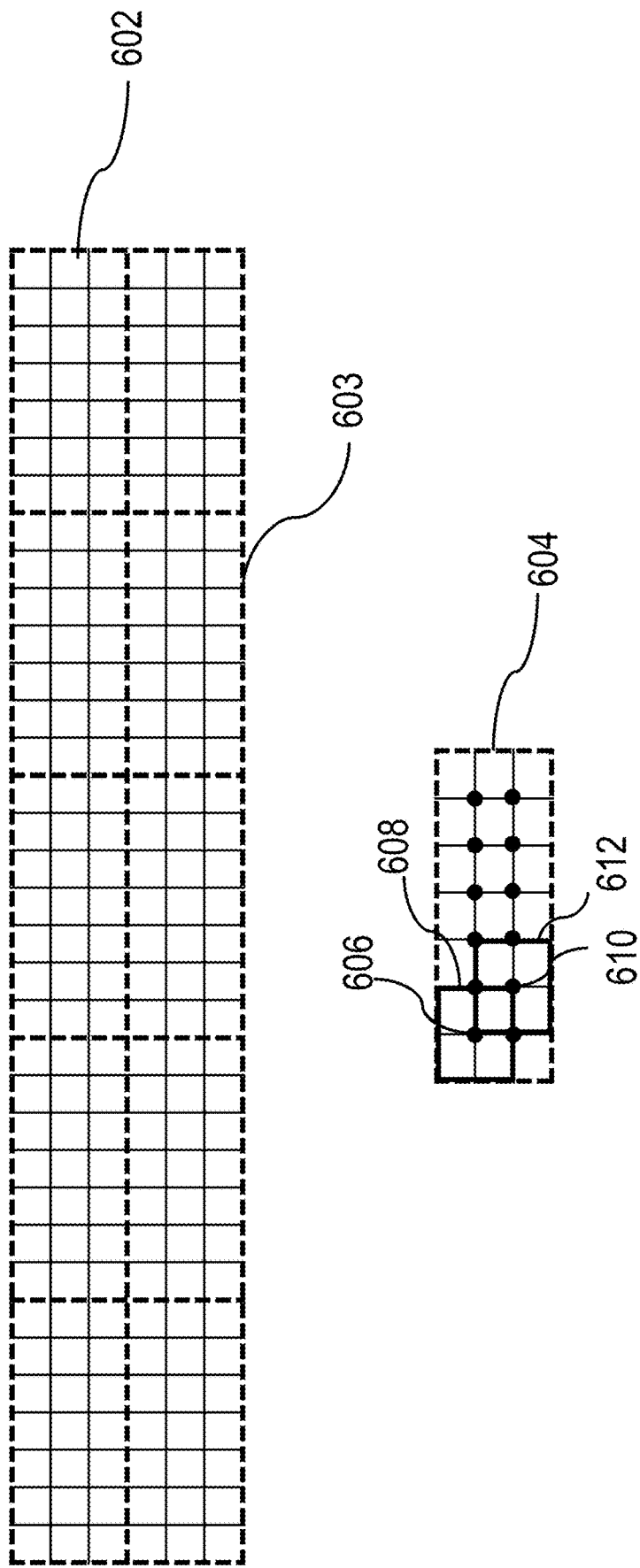
FIG. 6 illustrates an example of a feature extraction process, according to an embodiment.

Turning briefly to FIG. 6, an example of extracting key points based on the HOG features is illustrated. The image ROI 602 may be divided into non-overlapping tiles to compute the HOG features. These tiles may then be grouped into larger regions 603 (the dotted lines). For each region 604, as illustrated, every 2 tiles by 2 tiles may be grouped into one patch with a candidate key point at the center of this patch. For example, 606 and 610 are candidate key points at the center of the 2 tiles by 2 tiles patches 608 and 612 respectively. These patches are overlapping and each patch is represented by its center point and a score which is a function of the gradients orientations and magnitudes determined in the HOG features of its tiles. For each region, the patch having a maximum score may be determined and selected as a key point, if its score exceeds a predetermined threshold, otherwise this region will not be represented by any key points, which indicates that this region has no dependable key points that can be used for alignment. This results in a distribution of key points over the image ROI, which may be the output from the feature extraction process. The image ROI may be defined as the overlap between the two images to be stitched. The number and size of the regions may be predetermined based on factors such as the resolution of the image, the total size of the image, the number and size of tiles, the number and size of patches, etc.

Figure 7A:
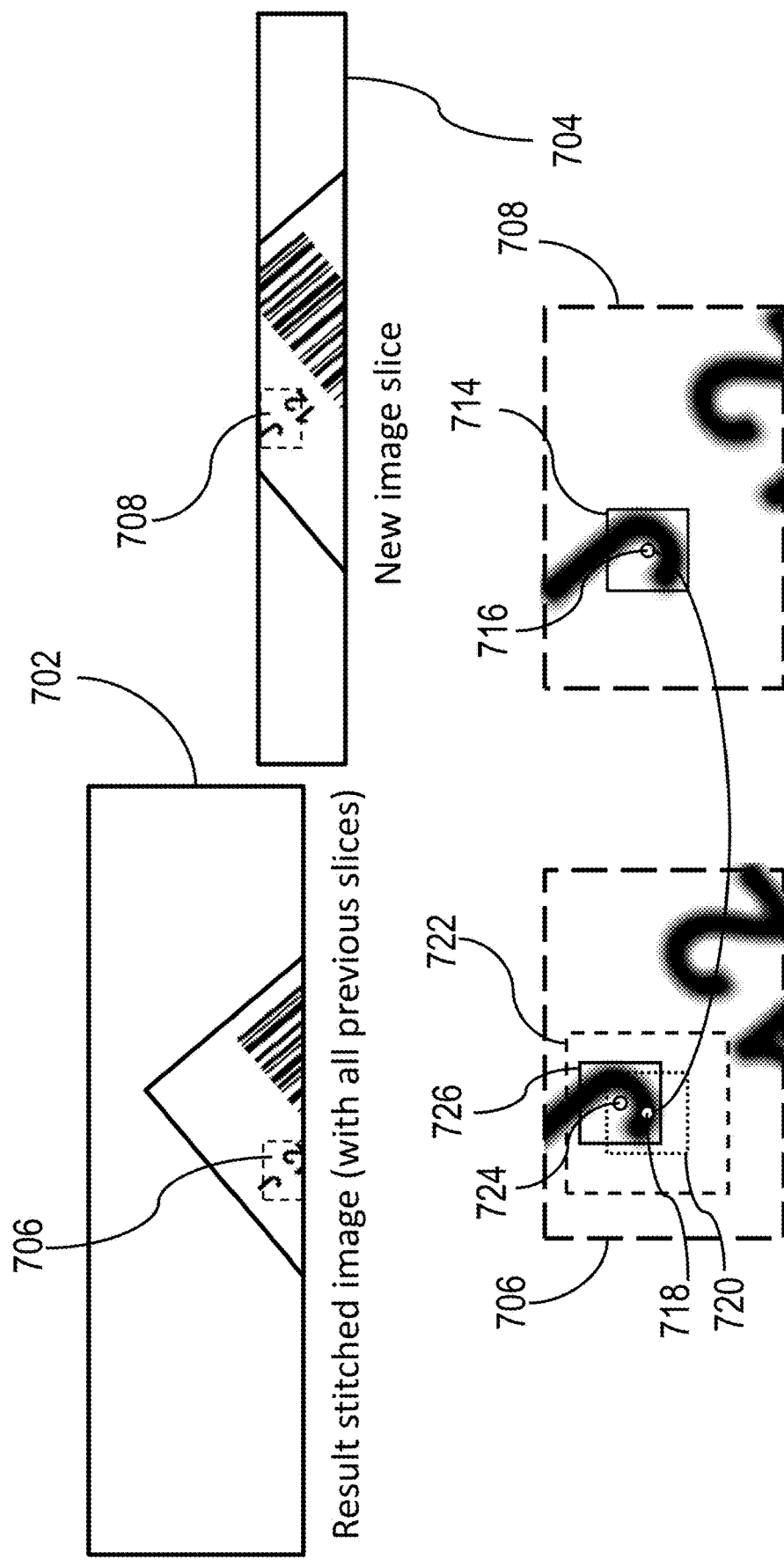
FIGS. 7a and 7b illustrate examples of feature matching, according to an embodiment.

Returning to FIG. 5, process 520 may then use the extracted key points from the current image slice to find matching key points in the result image. Referring to FIG. 7a, each key point extracted from the image ROI of a new image slice 704 may be used to search for a corresponding key point in the result stitched image 702 that contains all the previously stitched image slices. For example, the region represented by 708 in the new slice 704 had the patch 714 centered at the key point 716 as the selected key point with maximum score in this region. The goal of the process is to find the correct matching point 724 centered at the matching patch 726 in the region 706 in result image 702. For example, template matching of the patch 714 within the region 722 in the region 706 may be used to find the matching patch 726.

In some embodiments, a new image slice is acquired every specific predefined physical distance, which maps through the image resolution to a specific known transformation, typically translation, as in the 2D coordinate transform, that relates every image slice to the previous image slice and hence to the result image.

In embodiments, the object may be translated in accordance with substantially linear motion. Substantially linear motion is motion at a substantially constant speed and in substantially one direction. In embodiments in which the object is translated at a substantially constant speed, new image slices may be acquired at specific predefined physical distances by acquiring images at substantially fixed time intervals. A speed may be considered to be substantially constant and time intervals may be considered to be substantially fixed if the speed and interval variations are small enough so that the resulting variations in acquisition distance are small enough that the stitching and other processes described herein may still be successfully performed. Motion may be considered to be in substantially one direction when the line along which the object moves, etc., with reference to the point or region toward which line is directed is sufficiently constant that the stitching and other processes described herein may still be successfully performed. One example of linear motion may be an object may be moved on a straight (linear) conveyor. However, this is merely an example. The present techniques are equally applicable to any embodiment in which motion in substantially one direction occurs. In embodiments in which an encoder is provided, new image slices may be acquired at specific predefined physical distances based on the distance information provided by the encoder.

The transformation which maps through the image resolution to a specific known transformation, typically translation, may be referred to here as the approximate 2D coordinate transform because it is based on an ideal acquisition setup. In practical setups, this 2D coordinate transform may map a key point 716 in the new image slice 704 to a point 718 in the result image 702, which may not be a perfect match. Such mismatch may be due, for example, to vibrations of the object or slight delays in the camera acquisition. A relatively small search space 722 may then be centered at the point 718 and template matching may be executed only inside this search space to find the correct match 724 to the key point 716. In embodiments, the mismatch may be sufficiently small, or the stitching accuracy sufficiently high to allow decoding of a mark on the object or to allow further processing or analysis of the image. For example, a mark on the object that may be decoded may include a 1D or 2D barcode, etc. Likewise, text on the object may be recognized or other features of or on the object may be recognized or analyzed. In addition, the approximate 2D coordinate transform might be used as is, without refinement, for example, in the case of an object having no features to use for refinement such as a plain cardboard box. In this case, the approximate 2D coordinate transform may be good enough to be used for alignment since images with no clear edges do not require perfect alignment.

It is to be noted that stitching and decoding processing may be performed using sequential processing, parallel processing, or some combination of the two. For example, in embodiments, stitching of images may be performed in parallel. For example, each of a plurality of pairs of images may be stitched in parallel. Likewise, in embodiments, stitching of images may be performed in parallel with decoding of marks on the object, or in parallel with other further processing of images of the object. Such parallel stitching, decoding, and/or other processing may be performed using any of a number of known parallel processing techniques.

Figure 7B:
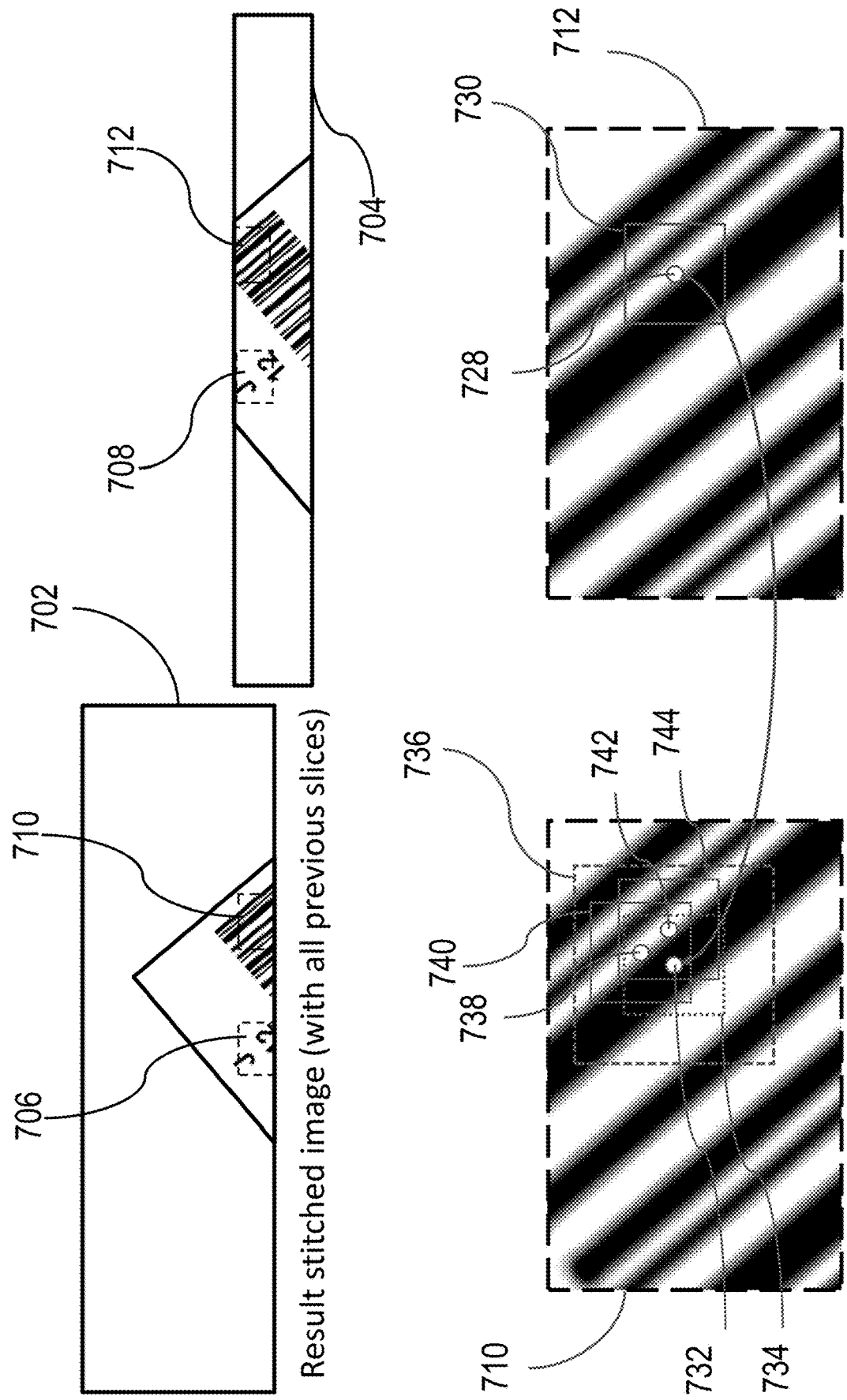

FIG. 7b illustrates an important case related to the key points' extraction. Region 712 in the image 704 illustrates an example of a bad key point 728. Although the patch 730 centered at the point 728 has multiple strong edges, they all have the same direction. When the approximate 2D coordinate transform is applied to key point 728 it maps it to point 732 which is very close to the correct match but searching within the search space 736 can lead to multiple points that perfectly match 728 for example 738 and 742. This explains why the selection of the key points is based on a score that uses the HOG features to guarantee not only that the patch has strong edges but also multiple different directions. This means that a key point candidate such as 728 will not be selected as a key point, further a region such as 712 will have no key points extracted from it because the key point with the maximum score will not exceed the selection threshold. In embodiments not shown in FIG. 7, features to be matched may be extracted from each image and then matched. For example, the matching method may be one of matching corresponding key points using least squares fitting, or locating a best corresponding position of a key point using known alignment methods, such as normalized correlation.

Returning to FIG. 5, process 520 may then use the set of corresponding key points that was computed to fit a 2D coordinate transform that aligns the new image slice to the result image. For example, a random sample consensus (RANSAC) process may be used to fit an accurate transform that filters out any outliers resulting from matching problems. At process 522, the image slice to be stitched may be warped using the determined 2D coordinate transform. The 2D coordinate transform changes the spatial configuration of an image. Here, the 2D coordinate transform may be used to correct for spatial discrepancies in images or image slices that are to be stitched together. For example, the 2D coordinate transform may be used to align the two images so that they are ready to be blended. Preferably, all overlapping pixels may be aligned to exactly the same places in the two images. However, even where this is not possible, the 2D coordinate transform may provide sufficient alignment for blending to be performed successfully.

As at least a portion of the image slice to be stitched overlaps with the image being stitched to, the overlapping portions may be blended to form the resulting image. In some embodiments, the slices are roughly aligned with a translation in the direction of movement. This splits every new slice into an overlapping region and a new region as illustrated in FIG. 7. The blending of the overlapping pixels may use weighted averaging that allows for seamless transition between result image and the new image slice. For example, the upper part of the overlap region may give a higher weight to the result image which is reduced gradually until the lower part of the overlap region, which may give a higher weight to the new slice such that at the end of the overlap region there is not any seam lines between the overlap region and the new region of each new slice. In embodiments, other types of blending may be utilized.

After completing process 520 for the current slice, at 524, process 500 may loop back to 502 and obtain another slice to be processed. If there are no more slices to be processed, then at 524, the stitched image may be output. It is to be noted that in embodiments, the output image may include as few as two slices that have been stitched, or as many as all slices in a series of image captures that have been stitched. It is to be noted that in embodiments in which more than one camera is used, such as the example shown in FIG. 10, the system produces image slices that overlap between the two cameras 133a, 133b, and also overlap in translation of the parcel along the conveyor 120. In such an embodiment, images captured by the two or more cameras may be stitched together as well. For example, the image slices from each camera may be stitched together with the other image slices from that camera, then the resulting stitched images from each camera of the plurality of cameras may be stitched together to form a final, complete image. In some embodiments, each image slice from a camera may be stitched together with the image slice or slices captured substantially simultaneously by the other camera or cameras to form combined image slices, then the combined image slices may be stitched together to form a complete image. In some embodiments, each image slice acquired from each camera may be stitched directly to the same resulting image of previously stitched images from all cameras. The stitching processes that may be used to stitch images or image slices from different cameras are similar to the processes described above for stitching image slices from the same camera.

Figure 8:
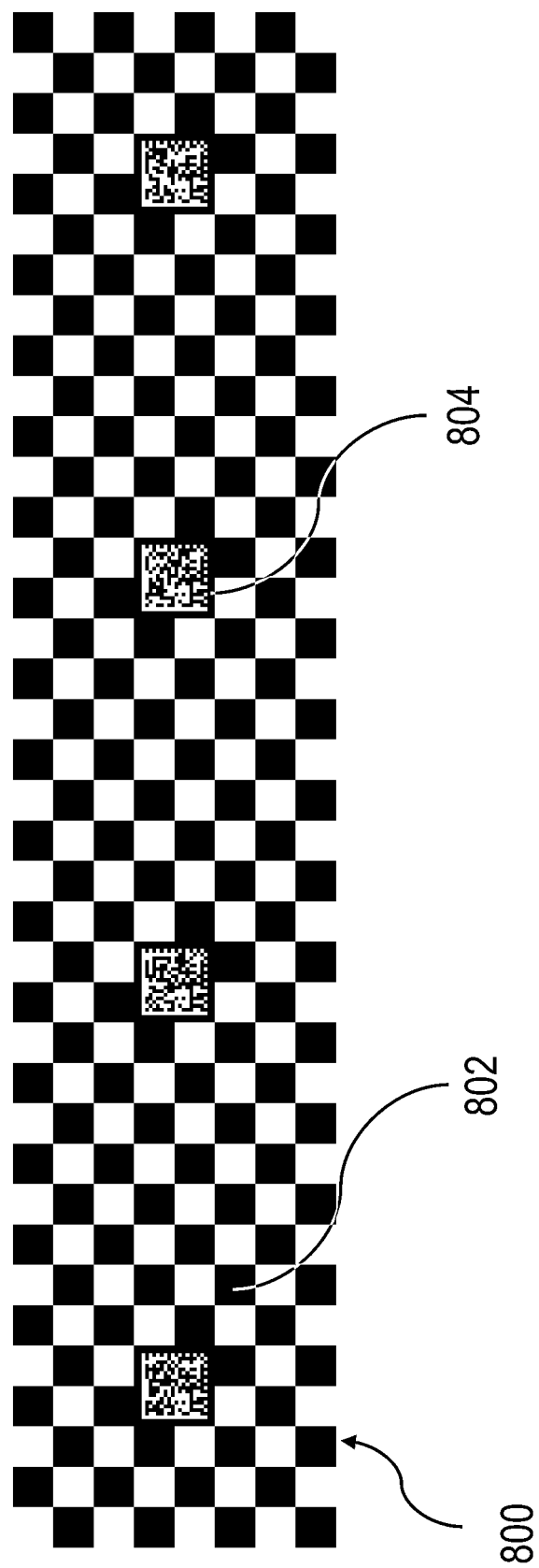
FIG. 8 illustrates an example of a calibration pattern, according to an embodiment.

FIG. 8 illustrates an exemplary calibration plate 800 that may be used to automate the computations for different parameters of the system. The plate may include a checkerboard pattern including a plurality of alternating white and black squares or checkers 802. These alternating squares may have fixed dimensions, such as 10 mm by 10 mm. These fixed dimensions may provide the capability to determine the image resolution at a specific fixed working distance. In addition, calibration plate or pattern 800 may include Data Matrix fiducials or patterns 804. These Data Matrix fiducials or patterns 804 may encode physical details about the plate such as the exact physical dimensions of the checkers and a reference to the coordinates of each point with respect to a fixed physical coordinate system defined on the plate. In addition, it may also be used to determine the presence or absence of a mirror in the optical path between the camera and the object.

Figure 9:
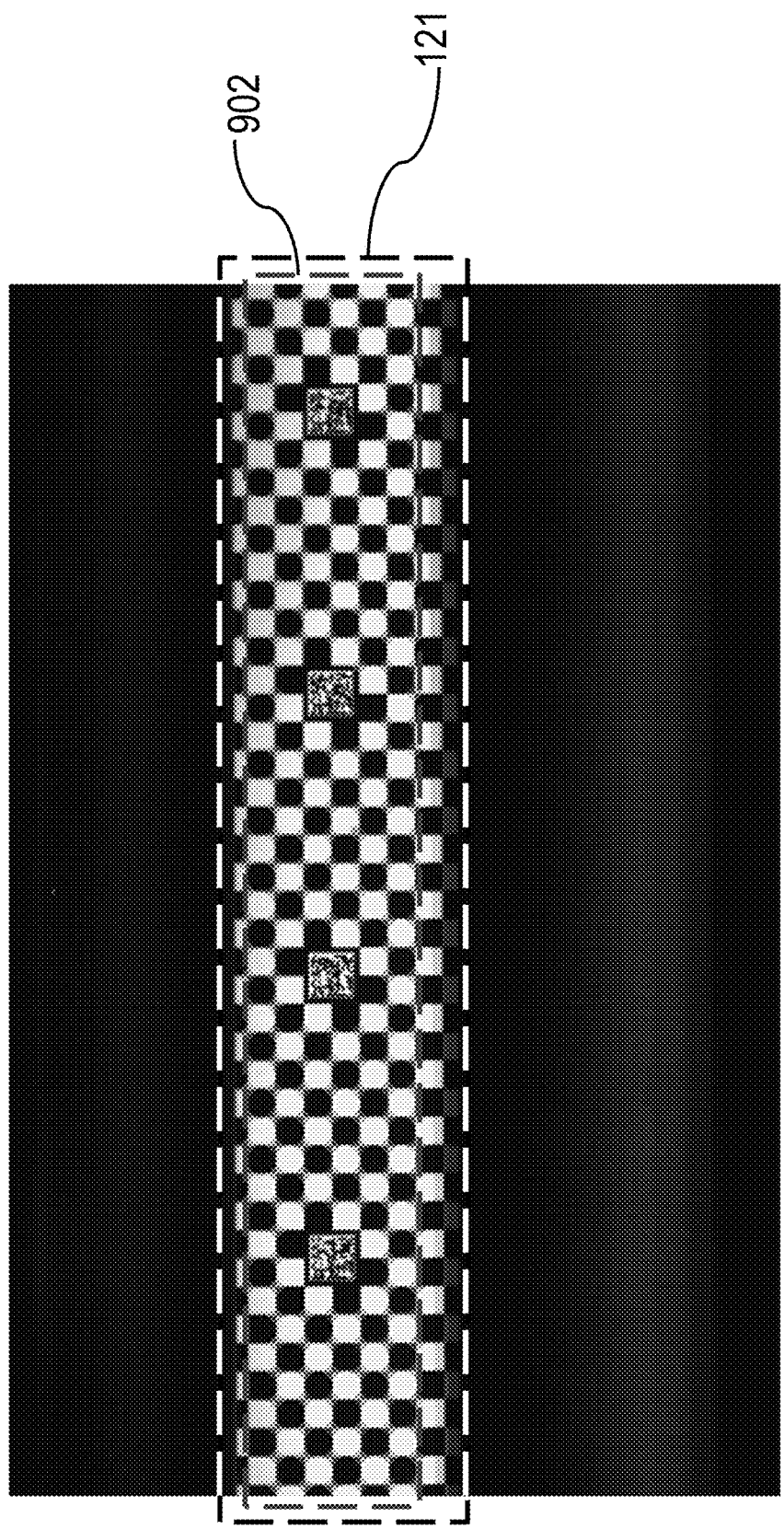
FIG. 9 illustrates an example of a calibration process, according to an embodiment.

A setup process may be used to initialize the acquisition setup illustrated in FIG. 1. This Process may be used to setup and calibrate the hardware and software used to perform stitching process 500. The setup process starts with acquiring at least one image for a stationary calibration plate placed over the viewing window similar to the image illustrated in FIG. 9. The region 121 in FIG. 9 corresponds to the region 121 in FIG. 1 that represents the viewing area. The checker corners are extracted from the image and the Data Matrix codes are decoded, which provides accurate set of pairs of points in the image domain and their corresponding locations in the physical domain. This set may be used to automatically:

find the effective field of view of the camera that defines the part of the acquired image 902 corresponding to the viewing area. The image sensor may be set to acquire only that part, which in many sensors is a key factor in the acquisition speed.

determine whether the view in the effective field of view is a perspective view or a non-perspective view. In many embodiments, perspective may be considered to be a form of distortion of the image being captured. Accordingly, for purposes of setup, it may be advantageous to validate that the image does not include such perspective distortion by physically correcting the setup or by warping the image after acquisition to correct the perspective effect.

Compute the resolution of the image in dpi at this working distance.

Then after the setup process, the system may be locked in place, all component orientations may be fixed, including camera orientation with respect to the viewing area, which defines the perspective.

In the stitching algorithm 500, and specifically in the matching process which is part of the process 520, an approximate 2D coordinate transform was referred to, which can accelerate the matching process by allowing a small search space for the matching of each key point. In some embodiments, this approximate 2D coordinate transform can be a simple translation in the direction of movement which can be computed by multiplying the physical distance between consecutive acquisitions and the image resolution computed in the setup process. Such a transform may be determined based on translation that is substantially linear motion. As described above, motion may be considered to be substantially linear motion when the motion at a substantially constant speed and in substantially one direction.

For example, if an encoder is used for triggering the acquisition of image slices and is set to produce 24 pulses per revolution, where one revolution is 12 inches, this result in acquiring a new image slice every half an inch the object moves. If the image resolution is computed in the setup process as 200 dpi, then the approximate 2D coordinate transform is a simple 100 pixels translation in the direction of movement. In embodiments, any values of, and combinations of, rotary motion per travel of conveyor 120, the number of pulses per revolution, and resolution may be utilized.

In some embodiments, the relationship of the individual image slices (estimating the approximate 2D coordinate transform) may be established using a training process that uses image slices acquired for a calibration moving object that has a known pattern of features such as a calibration plate or pattern 800 shown in FIG. 8. In this training process, the approximate 2D coordinate transform relating consecutive image slices may be determined by analyzing the checkers 802 and the Data Matrix fiducials 804 acquired across consecutive image slices.

Figure 10:
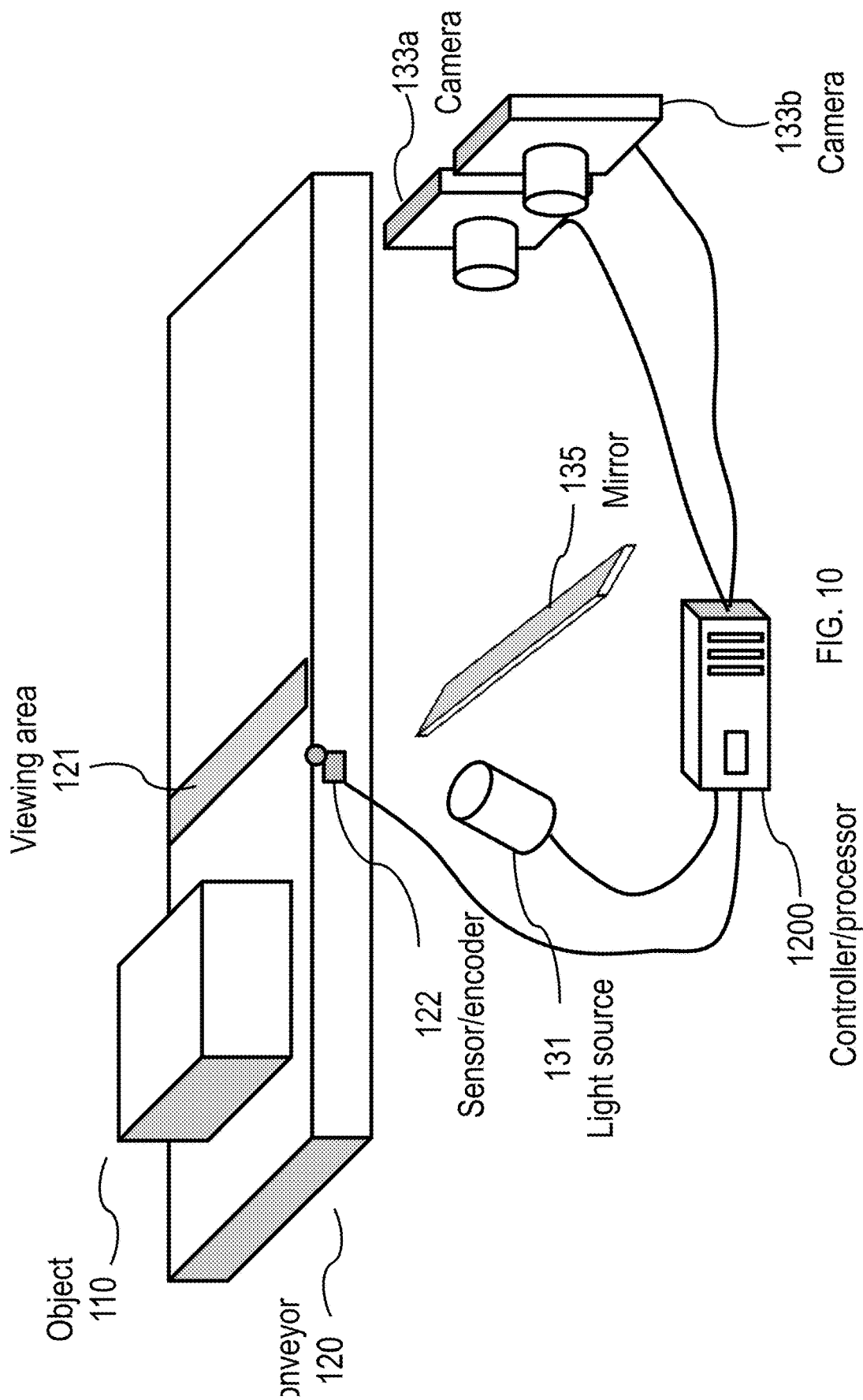
FIG. 10 illustrates a top view schematic diagram of a two-camera system, according to an embodiment.

FIG. 10 illustrates a top view schematic diagram with a two-camera system 133, according to an exemplary embodiment. Although two cameras are shown in this example, embodiments may include two or more cameras and the techniques described in relation to two cameras may be applied to more than two cameras. The system in this figure may include a conveyor 120, two cameras 133*a*, 133*b*, a light source 131, and a controller/processor 1200. The conveyor 120 translates an object 110, such as a parcel across a conveyor 120, which may include a viewing area 121, which may include an opening, a window, a gap, etc. The two cameras 133*a*, 133*b* may capture images through viewing area 121 via a mirror 135. For example, where the width (perpendicular to the direction of travel of conveyor 120) is too large to be captured by one camera, or is too large to be captured with adequate image quality by one camera, two or more cameras may be used. Embodiments may be applicable to any number of cameras. An example of such an embodiment is described in more detail below. In embodiments, cameras 133*a*, 133*b* may be configured to capture images substantially simultaneously, for example, within the timing accuracy of electronic circuitry to cause cameras 133*a*, 133*b* to function simultaneously.

In this example, the system produces image slices that overlap between the two cameras 133*a*, 133*b*, and also overlap in translation of the parcel along the conveyor 120. In such an embodiment, images captured by the two or more cameras may be stitched together as well. In embodiments, the use of the mirror 135 allows the cameras 133*a*, 133*b*, to be placed such that they do not have to face directly at the viewing area 121. Controller/processor 1200 may be arranged so as to cause cameras 133*a*, 133*b* to capture images at the same time, or at different times.

Figure 11:
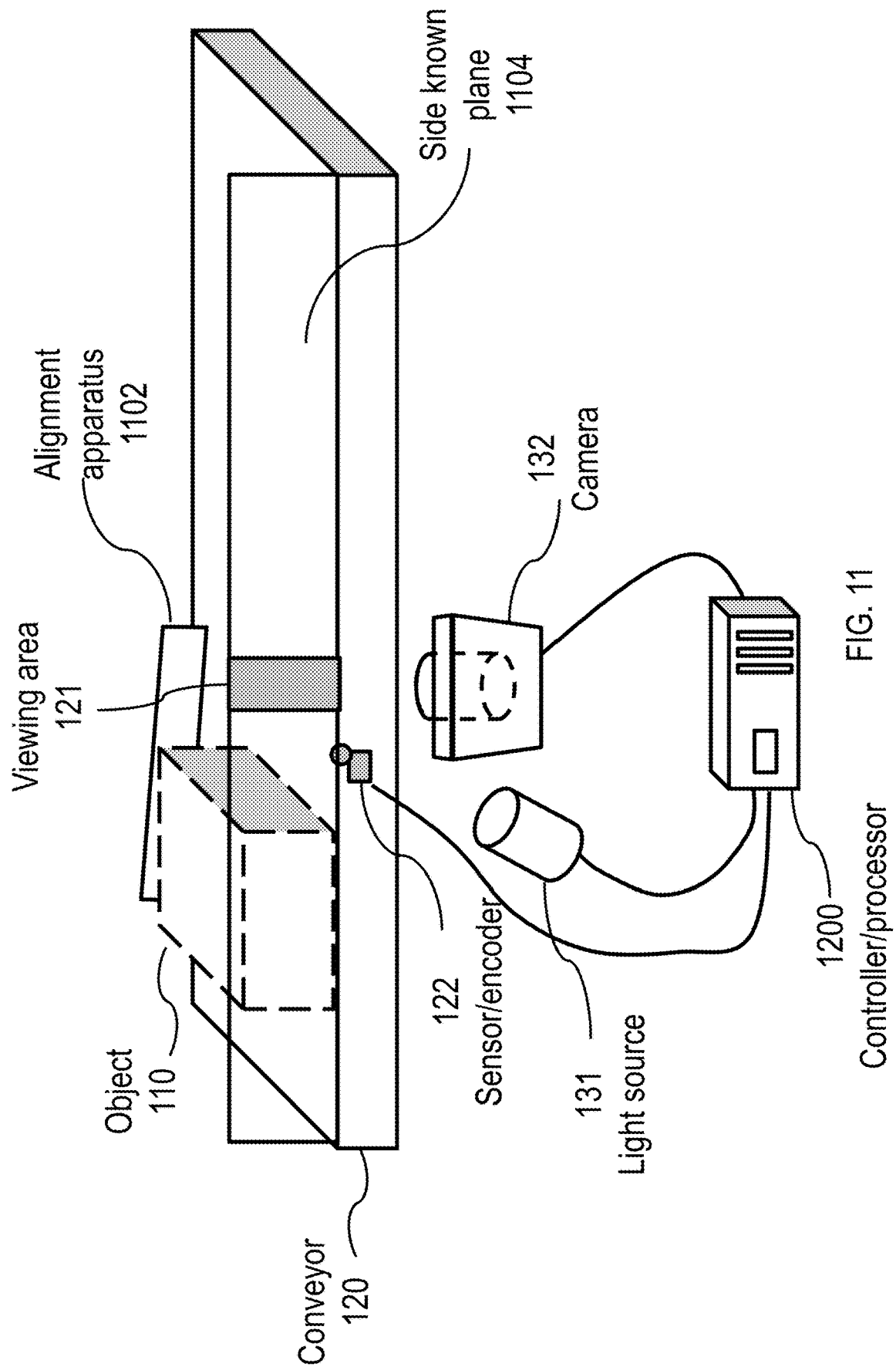
FIG. 11 illustrates a top view schematic diagram of a single-camera side imaging system, according to an embodiment.

An example of an embodiment in which a side surface of an object may be imaged is shown in FIG. 11. In this example, an object 110 may be translated on a conveyor 120 so as to image a side surface of the object. In this example, the side surface of the object is parallel to a side known plane 1104. Side known plane 1104 may be implemented, for example, using a side wall attached to conveyor 120. Such a side wall may be made of a transparent material, as shown, such as glass or clear plastic, etc., or the side wall may be made of an opaque material, such as metal. In embodiments, such a side wall may be of sufficient height that it is necessary to include a viewing area 121, such as a window, gap, or opening in side known plane 1104. In embodiments, camera 132 may be positioned or aimed so as to image objects in or through viewing area 121. In embodiments, such a side wall may be low enough that the side surface of the object may be imaged directly, without use of a window, gap, or opening. In embodiments, an alignment apparatus 1102 may be used to ensure that a side surface of object 110 is parallel to or aligned with side known plane 1104. In embodiments, alignment apparatus 1102 may be implemented, for example, using a mechanical apparatus, such as a spring-loaded flap, as shown in this example, to apply pressure to object 110 to align a side surface of object 110 to be parallel with side known plane 1104. In embodiments, alignment apparatus 1102 may be implemented, for example, using an electro-mechanical apparatus, to apply pressure to object 110 to align a side surface of object 110 to be parallel with side known plane 1104.

Figure 12:
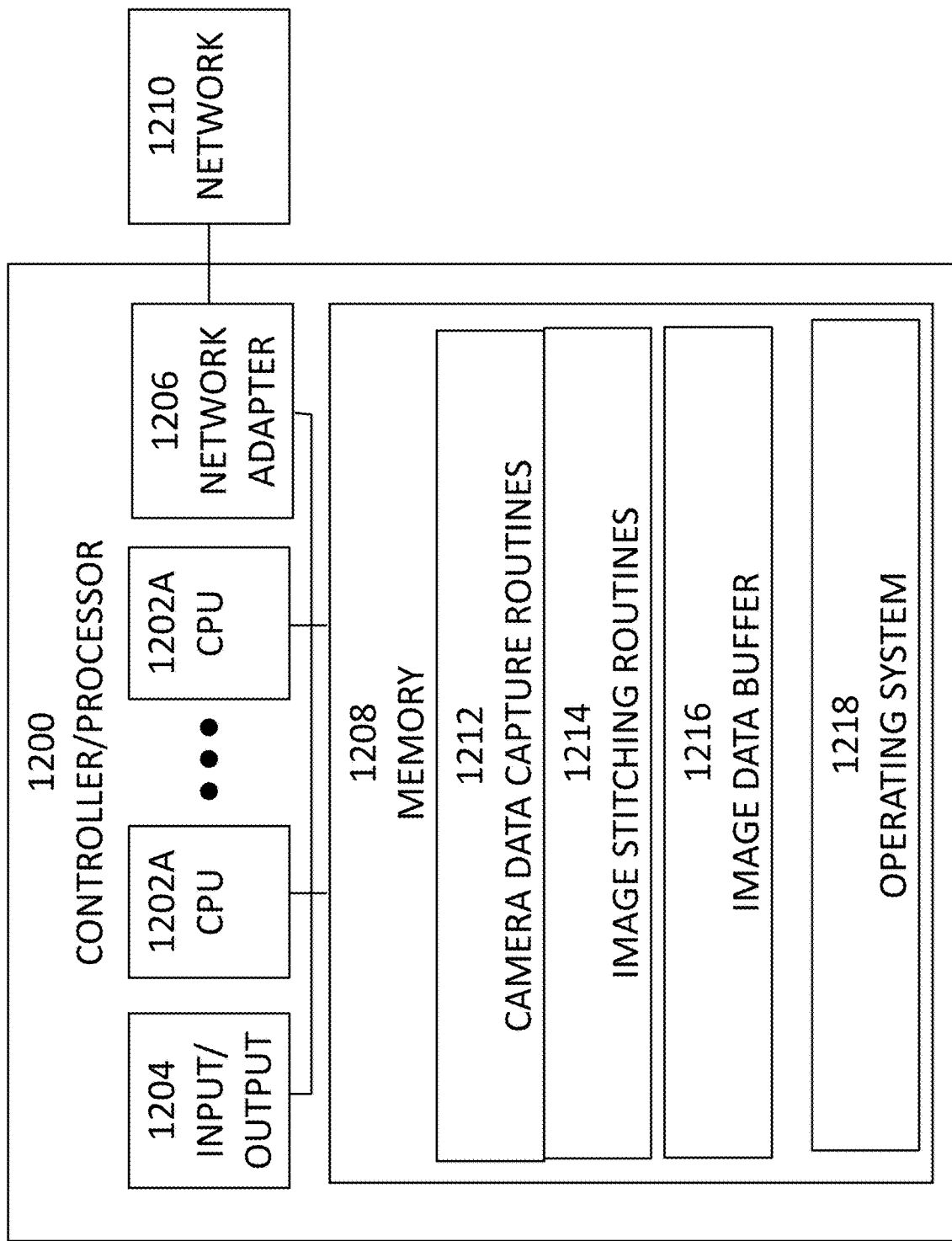
FIG. 12 illustrates a component schematic of the control system, according to an embodiment.

FIG. 12 illustrates a component schematic of the controller/processor 1200, according to an embodiment. The controller/processor 1200 comprises an input/output interface 1204 for receiving the images from the cameras. The input/output interface 1204 can also connect to the encoder 122 or the light source 131 to control it. Input/output devices (including but not limited to keyboards, displays, pointing devices) can be coupled to the system either directly or through intervening input/output controllers.

The controller/processor 1200 may have one or more CPUS 1202A. The controller/processor 1200, in embodiments, has network capability provided by a network adapter 1206 that connects to the communication network 1210. The network adapter may also be coupled to other data processing systems or storage devices through intervening private or public networks. The network adapter 1206 allows software and data to be transferred between the controller/processor 1200 and external devices. Examples of network adapters may include a modem, a network interface (such as an Ethernet card), a communications port, or a PCMCIA slot and card, etc. Software and data transferred via the network adapter are in the form of signals which may be, for example, electronic, electromagnetic, optical, or other signals capable of being received by the network adapter. These signals are provided to the network adapter via the network. This network carries signals and may be implemented using wire or cable, fiber optics, a phone line, a cellular phone link, an RF link, and/or other communications channels.

The controller/processor 1200 may contain one or more computer memory devices 1208, or one or more storage devices. The memory device 1208 can contain the camera data capture routines 1212 and the image stitching routines 1214. The image data buffer 1216 is also contained in the memory device, as is the operating system 1218.

The routines provided for in the invention, can, in embodiments, take the form of a computer program product accessible from a computer-usable or computer-readable medium providing program code for use by or in connection with a computer or any instruction execution system. For the purposes of this description, a computer-usable or computer-readable medium can be any apparatus that can contain, store, communicate, propagate, or transport the program for use by or in connection with the instruction execution system, apparatus, or device.

The medium can be an electronic, magnetic, optical, electromagnetic, infrared, semiconductor system (or apparatus or device), or a propagation medium. Examples of a computer-readable medium include a semiconductor or solid-state memory, magnetic tape, a removable computer diskette, a random-access memory (RAM), a read-only memory (ROM), a rigid magnetic disk, or an optical disk.

A data processing system suitable for storing and/or executing program code includes the at least one processor coupled directly or indirectly to the memory device through a system bus. The memory device can include local memory employed during actual execution of the program code, bulk storage, and cache memories which provide temporary storage of at least some program code in order to reduce the number of times code must be retrieved from bulk storage during execution.

Various software embodiments are described in terms of this exemplary computer system. After reading this description, it will become apparent to a person of ordinary skill in the relevant art(s) how to implement the invention using other computer systems and/or computer architectures.

The controller/processor 1200 can include a display interface (not shown) that forwards graphics, text, and other data (such as from a frame buffer (not shown)) for display on a display unit.

In this disclosure, the terms "computer program medium," "computer usable medium," and "computer readable medium" are used to generally refer to media such as main memory and storage memory, removable storage drives, and a hard disk installed in hard disk drive.

Computer programs (also called computer control logic) are stored in main memory and/or storage memory. Such computer programs, when executed, enable the computer system to perform the features of the present invention as discussed herein. In particular, the computer programs, when executed, enable the one or more processors to perform the operations described above.

From the above description, it can be seen that the present invention provides a system, computer program product, and method for the efficient execution of image stitching. References in the claims to an element in the singular is not intended to mean "one and only" unless explicitly so stated, but rather "one or more." All structural and functional equivalents to the elements of the above-described exemplary embodiment that are currently known or later come to be known to those of ordinary skill in the art are intended to be encompassed by the present claims. No claim element herein is to be construed under the provisions of 35 U.S.C. section 112, sixth paragraph, unless the element is expressly recited using the phrase "means for" or "step for."

While the foregoing written description of the invention enables one of ordinary skill to make and use what is considered presently to be the best mode thereof, those of ordinary skill will understand and appreciate the existence of alternatives, adaptations, variations, combinations, and equivalents of the specific embodiment, method, and examples herein. Those skilled in the art will appreciate that the within disclosures are exemplary only and that various modifications may be made within the scope of the present invention. In addition, while a particular feature of the teachings may have been disclosed with respect to only one of several implementations, such feature may be combined with one or more other features of the other implementations as may be desired and advantageous for any given or particular function. Furthermore, to the extent that the terms "including", "includes", "having", "has", "with", or variants thereof are used in either the detailed description and the claims, such terms are intended to be inclusive in a manner similar to the term "comprising."

Other embodiments of the teachings will be apparent to those skilled in the art from consideration of the specification and practice of the teachings disclosed herein. The invention should therefore not be limited by the described embodiment, method, and examples, but by all embodiments and methods within the scope and spirit of the invention. Accordingly, the present invention is not limited to the specific embodiments as illustrated herein, but is only limited by the following claims.

What is claimed is:

1. A system for generating a stitched image of a bottom surface of an object on a transport device having a viewing area, the system comprising:
    a 2D digital optical sensor configured to capture sequential 2D digital images of the bottom surface of the object as the object moves across the viewing area;
    at least one controller operatively coupled to the 2D digital optical sensor and configured to perform the steps of:
        a) receiving a first digital image;
        b) receiving a second digital image; and
        c) stitching the first digital image and the second digital image using a stitching algorithm to generate a stitched image, wherein the stitching is performed by:
            accessing a 2D coordinate transform configured to align the first digital image and the second digital image;
            warping the second digital image using the 2D coordinate transform; and
            blending the warped second digital image with the first digital image.

2. The system according to claim 1, wherein the at least one controller repeatedly performs steps a)-c).

3. The system according to claim 1, wherein the first digital image comprises at least one of a captured digital image or a resulting image of previously stitched images.

4. The system according to claim 1, further comprising a light source configured to illuminate the object in the viewing area, wherein the at least one controller is coupled to the light source to control illumination from the light source.

5. The system according to claim 4, wherein the at least one controller is configured to strobe the light source.

6. The system according to claim 1, wherein the at least one controller is further configured to receive a signal from a sensor, the signal indicative of a presence or an absence of the object on the transport device, and wherein the at least one controller controls acquisition of images based on the received signal.

7. The system according to claim 1, further comprising a mirror, and wherein the 2D digital optical sensor captures the sequential 2D digital images through the mirror.

8. The system according to claim 1, wherein the at least one controller is further configured to decode a mark located within the stitched image.

9. The system according to claim 8, wherein the at least one controller is configured to perform the stitching in parallel with decoding the mark.

10. The system according to claim 1, wherein the at least one controller is further configured to recognize text within the stitched image.

11. The system according to claim 1, wherein the at least one controller is further configured to receive a signal from a motion encoder associated with the transport device, the signal indicative of an estimate of object translation, and
wherein the at least one controller controls acquisition of images based on the received signal.

12. The system according to claim 11, further comprising a light source configured to illuminate the object in the viewing area, wherein the at least one controller is coupled to the light source to control illumination from the light source based on the estimate of object translation.

13. The system according to claim 12, wherein the at least one controller is configured to strobe the light source based on the estimate of object translation.

14. The system according to claim 1, wherein the 2D optical sensor is configured to capture a reduced field of view determined by one of manually or by analyzing a full image acquired at a setup time.

15. A method for generating a stitched image of a bottom surface of an object on a transport device having a viewing area, the method comprising:
  accessing a first digital image of the bottom surface of the object located within the viewing area;
  accessing a second digital image of the bottom surface of the object located within the viewing area;
  stitching the first digital image and the second digital image suing a stitching algorithm to generate a stitched image, wherein the stitching is performed by:
    accessing a 2D coordinate transform configured to align the first digital image and the second digital image;
    warping the second digital image using the 2D coordinate transform; and
    blending the warped second signal image with the first digital image.

16. The method according to claim 15, further comprising decoding a mark based on the stitched image.

17. The method according to claim 15, wherein the first digital image comprises at least one of a captured digital image or a resulting image of previously stitched images.

18. The method according to claim 15, wherein the 2D coordinate transform is based on an estimate of object translation.

* * * * *